(12) United States Patent
Lu et al.

(10) Patent No.: US 10,542,296 B2
(45) Date of Patent: Jan. 21, 2020

(54) CHROMA RESHAPING OF HDR VIDEO SIGNALS

(71) Applicant: Dolby Laboratories Licensing Corporation, San Francisco, CA (US)

(72) Inventors: Taoran Lu, Santa Clara, CA (US); Fangjun Pu, Sunnyvale, CA (US); Peng Yin, Ithaca, NY (US); Tao Chen, Palo Alto, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/091,078

(22) PCT Filed: May 9, 2017

(86) PCT No.: PCT/US2017/031793
§ 371 (c)(1),
(2) Date: Oct. 3, 2018

(87) PCT Pub. No.: WO2017/196869
PCT Pub. Date: Nov. 16, 2017

(65) Prior Publication Data
US 2019/0124367 A1   Apr. 25, 2019

Related U.S. Application Data

(60) Provisional application No. 62/333,979, filed on May 10, 2016.

(30) Foreign Application Priority Data

May 10, 2016   (EP) ..................................... 16168955

(51) Int. Cl.
*H04N 19/98* (2014.01)
*H04N 19/85* (2014.01)
*H04N 19/186* (2014.01)

(52) U.S. Cl.
CPC ........... *H04N 19/98* (2014.11); *H04N 19/186* (2014.11); *H04N 19/85* (2014.11)

(58) Field of Classification Search
None
See application file for complete search history.

(56) References Cited

U.S. PATENT DOCUMENTS

| | | | |
|---|---|---|---|
| 2007/0076127 A1* | 4/2007 | Abe | H04N 9/68 348/645 |
| 2011/0193896 A1* | 8/2011 | Johnson | G06T 5/009 345/690 |

(Continued)

FOREIGN PATENT DOCUMENTS

| | | |
|---|---|---|
| EP | 1413985 | 4/2004 |
| WO | 2014/130343 | 8/2014 |
| WO | 2014/204865 | 12/2014 |

OTHER PUBLICATIONS

Minoo, K. et al "Description of the reshaper parameters derivation process in ETM reference software", 23. JCT-VC meeting Feb. 19-26, 2016, (joint collaborative team on video coding of ISO/IEC JTC1/SC29/WG11 and ITU-T SG.16).

(Continued)

*Primary Examiner* — Kaitlin A Retallick

(57) ABSTRACT

Methods for the chroma reshaping of high-dynamic range (HDR) signals are presented. For each input pixel, a first scaler is generated based on the pixel luminance and a luma-based chroma reshaping (LCR) function. A second scaler is generated based on a saturation-based chroma reshaping (SCR) function and the saturation value of the pixel. A cascaded scaler is generated by multiplying the first scaler with the second scaler. Reshaped chroma values are generated by multiplying the input chroma values with the cascaded scaler. The characteristics of preferred LCR and SCR functions are discussed. Inverse decoding methods (Continued)

based on chroma-reshaping metadata that define the LCR and SCR functions are also described.

13 Claims, 7 Drawing Sheets

(56) References Cited

U.S. PATENT DOCUMENTS

| | | | | |
|---|---|---|---|---|
| 2015/0010059 | A1* | 1/2015 | Hattori | H04N 19/70 |
| | | | | 375/240.02 |
| 2016/0014420 | A1* | 1/2016 | Su | H04N 19/30 |
| | | | | 375/240.08 |
| 2017/0085889 | A1* | 3/2017 | Baylon | H04N 19/124 |
| 2017/0289555 | A1* | 10/2017 | Su | H04N 19/14 |
| 2018/0167637 | A1 | 6/2018 | Yin | |
| 2019/0052908 | A1* | 2/2019 | Mertens | H04N 19/186 |
| 2019/0124367 | A1* | 4/2019 | Lu | H04N 19/98 |

OTHER PUBLICATIONS

Lu, T. et at., "Implication of high dynamic range and wide color gamut content distribution", Optomechatronic Micro/Nano Devices and Components 111 : Oct. 8-10, 2007, Lausanne, Switzerland; [Proceedings of SPIE, ISSN 0277-786X], SPIE, Bellingham, Wash, vol. 9599, Sep. 22, 2015, pp. 95990B-95990B.

Lee, S. et al., "CE2-related : Report of LumaATF with LCS", 113 MPEG Meeting; Oct. 19, 2015 to Oct. 23, 2015; Geneva; (Motion Picture Expert Group or ISO/IEC JTCI/SC29/(WG11), No. M37245, Oct. 16, 2015.

Pu, F. et al. "Comments on reshaping for HDR/WCG compression", 113, MPEG Meeting, Oct. 19, 2015 to Oct. 23, 2015; Geneva, (Motion Picture Expert Group or ISO/IEC JTCI/SC29/WG11), No. m37267, Oct. 21, 2015, XP030065635, the whole document.

Stessen, J. et al. "Chromaticity based color signals for wide color gamut and high dynamic range" 110 MPEG Meeting, Oct. 20, 2014 to Oct. 24, 2014, Strasbourg, (Motion Picture Expert Group or ISO/IEC JTCI/SC29/WG11).

Ebner, F. et al "Development and testing of a color space (ipt) with improved hue uniformity", Color Science, Systems and Applications; Final Program and Proceedings of IS&T, US, Nov. 1, 1998, pp. 8-13.

ITU-R Report BT 2390-0, "High Dynamic Range Television for Production and International Programme Exchange" 2016.

SMPTE ST 2084:2014 "High Dynamic Range EOTF of Mastering Reference Displays" Aug. 16, 2014.

Minoo, K. et al "Exploratory Test Model for HDR Extension of HEVC" ISO/IEC JTC1/SC29/WG11, Geneva, CH, Oct. 2015, N15792.

Ramasubramonian, A.K. et al HDR CE2.a-1: Report on LCS, San Diego, USA, Feb. 2016, ITU-T SG16 WP3.

* cited by examiner

CHROMA RESHAPING OF HDR VIDEO SIGNALS

CROSS-REFERENCE TO RELATED APPLICATIONS

This application claims the benefit of priority from the U.S. Provisional Patent Application, Ser. No. 62/333,979 and the EP Patent Application Ser. No. 16168955.9, both filed on May 10, 2016, and each one incorporated herein by reference in its entirety.

TECHNOLOGY

The present invention relates generally to images. More particularly, an embodiment of the present invention relates to chroma reshaping of high-dynamic range (HDR) images and video signals.

BACKGROUND

The legacy YCbCr color format is a color-opponent, non-constant luminance format, where signals are interpreted based on color differences in an opposing manner. In YCbCr and similar color-opponent formats (such as YUV) the goal is to separate luma from chroma information for the purposes of chroma subsampling (i.e., 4:2:2 and 4:2:0). Chroma sub-sampling reduces the amount of data required to represent an image without affecting perceptually overall picture quality. Separating color from luma has also been proven to yield coding advantages in a variety of image and video coding standards, such as JPEG, MPEG-1, MPEG-2, AVC, HEVC, and the like.

Recently, High dynamic range (HDR) and wide color gamut (WCG) content have revealed the limitations of existing color encoding methods. Errors that were previously small with standard dynamic range can become magnified. Report ITU-R BT.2390-0 (2016), "*High dynamic range television for production and international programme exchange*," which is incorporated herein by reference in its entirety, provides an alternative method for color difference encoding using a new color space referred to as the ICtCp (or $IC_TC_P$) color format.

Like YCbCr, ICtCp is a color-opponent based encoding scheme intended to separate luma from chroma information. In addition, ICtCp offers constant intensity (CI) representation. The CI neutral (grey) axis is encoded with the SMPTE ST 2084 or Hybrid Log-Gamma (HLG) non-linearity functions to match the human visual system, and to optimize it for high dynamic range signal encoding. Starting from RGB or XYZ representations, color transformation matrices to the ICtCp color format have been optimized for the human visual system perception of HDR and WCG content.

Most of the existing video compression standards, such as MPEG-1, MPEG-2, AVC, HEVC, and the like, have been tested, evaluated, and optimized for gamma-coded images in the YCbCr color space; however, experimental results have shown that the ICtCp color format may provide a better representation for high-dynamic range images with 10 or more bits per pixel per color component.

As used herein, the term "reshaping" refers to a pre-processing operation on an HDR image, such as scaling, quantization, and the like, to map it from its original bit depth to an image of a lower or the same bit depth to allow for more efficient coding using existing coding standards and devices. 'Forward reshaping' parameters used by an encoder may be communicated to a receiver as part of the coded bitstream using metadata so that a compliant decoder may apply an 'inverse' or 'backward reshaping' operation to reconstruct the original signal at its full dynamic range. Reshaping may be applied to any or all of the color components of an HDR signal. To improve existing and future coding standards, as appreciated by the inventors here, improved techniques for the chroma reshaping of HDR video are needed.

As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1A:
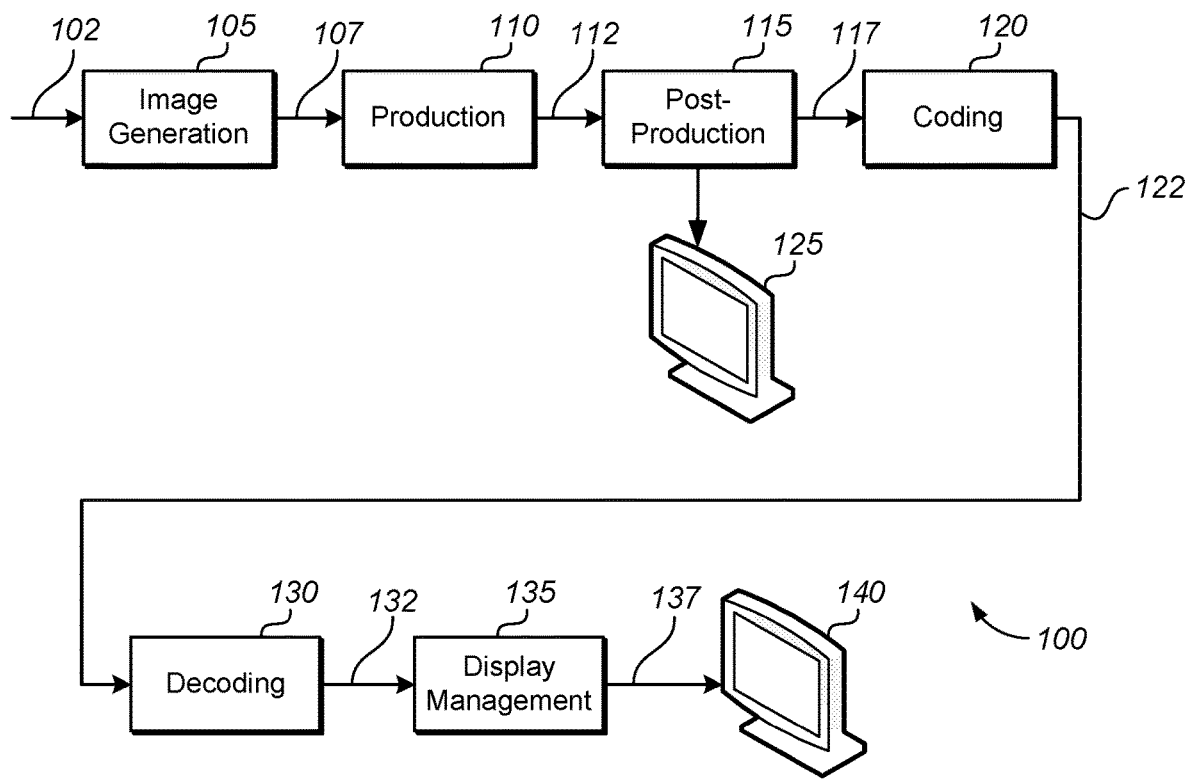
FIG. 1A depicts an example process for a video delivery pipeline.

Chroma reshaping of high dynamic range (HDR) images is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to methods for chroma reshaping of high-dynamic range images. In a video encoder, in one embodiment, in a method to reshape chroma components in an input image, a processor receives an input image comprising pixels, wherein each pixel comprises a luminance component and two chroma components. For a pixel in the input image, the processor generates a first scaler based on a luma-based chroma reshaping (LCR) function and the luma component of the pixel. It computes a saturation value for the pixel based on the chroma components of the pixel. It computes a second scaler based on a saturation-based chroma reshaping (SCR) function and the saturation value of the pixel, and generates a cascaded scaler by multiplying the first scaler with the second scaler. The processor generates reshaped chroma components for the pixel by multiplying each of the chroma components of the pixel with the cascaded scaler.

In a second embodiment, in a decoder, a processor receives a reshaped image comprising pixels, wherein each pixel comprises a luminance component and two chroma components. For a pixel in the reshaped image, the processor generates a first inverse scaler based on a luma-based chroma reshaping (LCR) function and the luma component of the pixel. It computes a saturation value for the pixel based on the chroma components of the pixel. It generates a scaled saturation value by multiplying the saturation value with the first inverse scaler. It computes an inverse saturation value based on a saturation-based chroma reshaping (SCR) function and the scaled saturation value of the pixel. It computes a second inverse scaler by dividing the inverse saturation value with the saturation value, and generates inverse reshaped chroma components for the pixel by multiplying each of the chroma components of the pixel with the second inverse scaler.

In a third embodiment, in a decoder, a processor receives a reshaped image comprising pixels, wherein each pixel comprises a luminance component and two chroma components. For a pixel in the reshaped image, the processor generates a first inverse scaler based on a luma-based chroma reshaping (LCR) function and the luma component of the pixel. It computes intermediate chroma components by multiplying each of the two chroma components of the pixel with the first inverse scaler. It computes a saturation value for the pixel based on the intermediate chroma components of the pixel.

It computes an inverse saturation value based on a saturation-based chroma reshaping (SCR) function and the saturation value of the pixel. It computes a second inverse scaler by dividing the inverse saturation value with the saturation value, and generates inverse reshaped chroma components for the pixel by multiplying each of the chroma components of the pixel with the second inverse scaler.

Chroma Reshaping for High Dynamic Range (HDR) Video in ICtCp

The ICtCp Color Format

As described in the ITU-R Report BT. 2390-0, the ICtCp color format is based in part on the IPT color space, which, is described in "*Development and testing of a color space (ipt) with improved hue uniformity*", by F. Ebner and M. D. Fairchild, in Proc. 6$^{th}$ Color Imaging Conference: Color Science, Systems, and Applications, IS&T, Scottsdale, Ariz., November 1998, pp. 8-13 (to be referred to as the Ebner paper), which is incorporated herein by reference in its entirety. As described by the Ebner paper, IPT is a model of the color difference between cones in the human visual system. In this sense it is like the YCbCr or CIE-Lab color spaces; however, it has been shown in some scientific studies to better mimic human visual processing than these spaces. Like CIE-Lab, IPT is a normalized space to some reference luminance. In an embodiment, the normalization is based on the maximum luminance of a target display (e.g., 5,000 nits).

The term "PQ" as used herein refers to perceptual quantization. The human visual system responds to increasing light levels in a very non-linear way. A human's ability to see a stimulus is affected by the luminance of that stimulus, the size of the stimulus, the spatial frequency(ies) making up the stimulus, and the luminance level that the eyes have adapted to at the particular moment one is viewing the stimulus. In a preferred embodiment, a perceptual quantizer function maps linear input gray levels to output gray levels that better match the contrast sensitivity thresholds in the human visual system. An example of a PQ mapping function is described in the SMPTE ST 2084:2014 specification, titled "*High Dynamic Range Electro-optical Transfer Function of Mastering Reference Displays*," Aug. 16, 2014, incorporated herein by reference in its entirety, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidently may have a very rough similarity to the way the human visual system responds, a PQ curve imitates the true visual response of the human visual system using a relatively simple functional model.

$IC_T C_P$, also to be referred to as ICtCp, is a proposed new color format especially designed for processing high dynamic range and wide color gamut (WCG) signals. It combines IPT with PQ. I (Intensity) denotes the brightness of the PQ-encoded signal, $C_T$, Tritan Axis, corresponds to blue-yellow perception, and $C_P$, Protan Axis, corresponds to red-green color perception. In addition to the discussed features of IPT and PQ, in ICtCp:

- chroma is rotated to align skin tones more closely to YCbCr
- color transformation matrices from XYZ to ICtCp are optimized for better uniformity and linearity for WCG images and improved isoluminance and stability with respect to HDR and WCG images As used herein, the term "isoluminance" refers to a measure of how well luminance (say, I of ICtCp or Y of YCbCr) correspond to true luminance. Indirectly, it measures how well a color space separates luma from chroma.

From an implementation point of view, using the ICtCp color space requires the same hardware and signal flow as using the traditional gamma-coded YCbCr.

Video Coding of ICtCp Signals

Embodiments described herein focus in improving the coding efficiency of HDR ICtCp signals as coded using the HEVC (also known as H.265) Main 10 Profile; however, a person skilled in the art of video coding would appreciate that the same methods are applicable to other AVC/HEVC Profiles, alternative codecs (e.g., VP9 and the like), and alternative color-opponent color spaces for coding high-dynamic range images, such as YCbCr.

FIG. 1A depicts an example process of a conventional video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137).

Signal Reshaping

Currently, most digital interfaces for video delivery, such as the Serial Digital Interface (SDI) are limited to 12 bits per pixel per component. Furthermore, most hardware-implementations of compression standards, such as H.264 (or AVC) and H.265 (or HEVC), are limited to 10-bits per pixel per component. Therefore efficient encoding and/or quantization is required to support HDR content, with dynamic range from approximately 0.001 to 10,000 cd/m² (or nits), within existing infrastructures and compression standards.

Figure 1B:
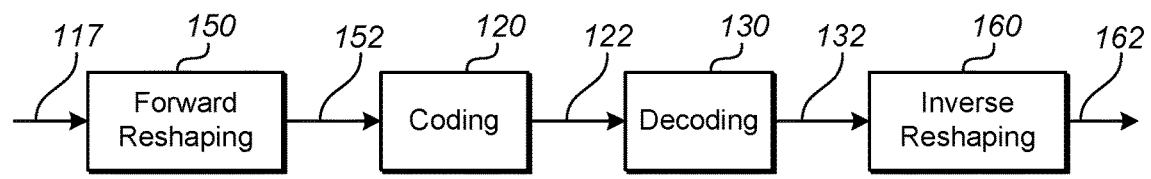
FIG. 1B depicts an example process for data compression using signal reshaping.

FIG. 1B depicts an example process for signal reshaping according to an embodiment. Given input frames (117), a forward reshaping block (150) analyzes the input and the coding constrains and generates codeword mapping functions which map input frames (117) to re-quantized output frames (152). For example, input (117) may be gamma-coded or PQ-coded according to certain EOTF. In some embodiments, information about the reshaping process may be communicated to downstream devices (such as decoders) using metadata. Following coding (120) and decoding (130), decoded frames (132) may be processed by an inverse reshaping function (160), which converts the re-quantized frames (132) back to the original EOTF domain (e.g., gamma or PQ), for further downstream processing, such as the display management process (135) discussed earlier. In some embodiments, the inverse reshaping function (160) may be integrated with a de-quantizer in decoder (130), e.g., as part of the de-quantizer in an AVC or HEVC video decoder.

An example of a signal reshaping function based on a power function was presented in U.S. patent application Ser. No. 14/771,101, filed on Aug. 27, 2015, "Encoding perceptually-quantized video content in multi-layer VDR coding," (published as US2016/0014420), which is incorporated herein by reference in its entirety.

Chroma Distortion when Coding 10-Bit HDR Video in ICtCp

Based on a number of experiments with test patterns coded as 10-bit data, in the ICtCp color format, using the Main 10 HEVC Profile, the inventors have made the following observations:

Given equal amounts of chroma coding errors, color distortion is less apparent at very high or very low luminance ranges. For example, given a 4,000 nits display, chroma artifacts are easier to perceive when the signal has luminance range in 1 nits to 1,000 nits. When luminance of the signal is very low (e.g. 0.1 nits) or very high (e.g. 4,000 nits), color distortions are less visible. In other words, very low and/or very high luminance values may mask chroma errors.

Colors with low saturation (achromatic colors) exhibit more severe chroma artifacts in terms of hue shift and/or saturation than saturated colors. For example, a gray color may exhibit arbitrary hue when its Ct and Cp components are corrupted by small errors. This suggests that areas with low saturation need to be treated more carefully to reduce chromatic distortions.

As appreciated by the inventors, in view of these observations, chroma reshaping in HDR images should be a function of both the input intensity and saturation.

Other examples of reshaping tools for YCbCr content may be found in document N15792 "Exploratory Test Model for HDR extension of HEVC," by K. Minoo, et al., ISO/IEC JTC1/SC29/WG11, Geneva, CH, October 2015, and in JCTVC-W0101, "HDR CE2.a-1: Report on LCS," by A. K. Ramasubramonian et al., ITU-T SG 16 WP 3 and ISO/IEC JTC 1/SC 29/WG 11, San Diego, USA, February, 2016. While these methods take into consideration the luminance value for chroma reshaping, they fail to address the previous observations related to coding in the ICtCp color format. In contrast, the proposed reshaping methods take into consideration the influence of both luminance and saturation values.

Cascaded Chroma Reshaping (CCR)

Let $$Sat = \sqrt{C_T^2 + C_P^2}, \quad (1)$$

and $$\theta = \operatorname{atan2}\left(\frac{C_P}{C_T}\right),$$

denote the saturation and hue angle of a pixel with I, $C_T$, and $C_P$ color components, where $C_T$ and $C_P$ are normalized values in the range [−0.5 0.5], and atan 2( ) is defined as $$\operatorname{atan2}\left(\frac{y}{x}\right) = \begin{cases} \arctan\left(\frac{y}{x}\right) & x > 0 \\ \arctan\left(\frac{y}{x}\right) + \pi & y \geq 0, x < 0 \\ \arctan\left(\frac{y}{x}\right) - \pi & y < 0, x < 0 \\ +\frac{\pi}{2} & y > 0, x = 0 \\ -\frac{\pi}{2} & y < 0, x = 0 \\ 0 & y = 0, x = 0 \end{cases} \quad (2)$$

In equation (2), arctan( ) is the standard inverse tangent function with output value range in $$\left[-\frac{\pi}{2}, \frac{\pi}{2}\right],$$

so atan 2( ) has output value θ range in (−π, π]. Equation (1) may also be applied to compute saturation in other color formats, (e.g., for YCbCr, $Sat=\sqrt{Cb^2+Cr^2}$).

Figure 2:
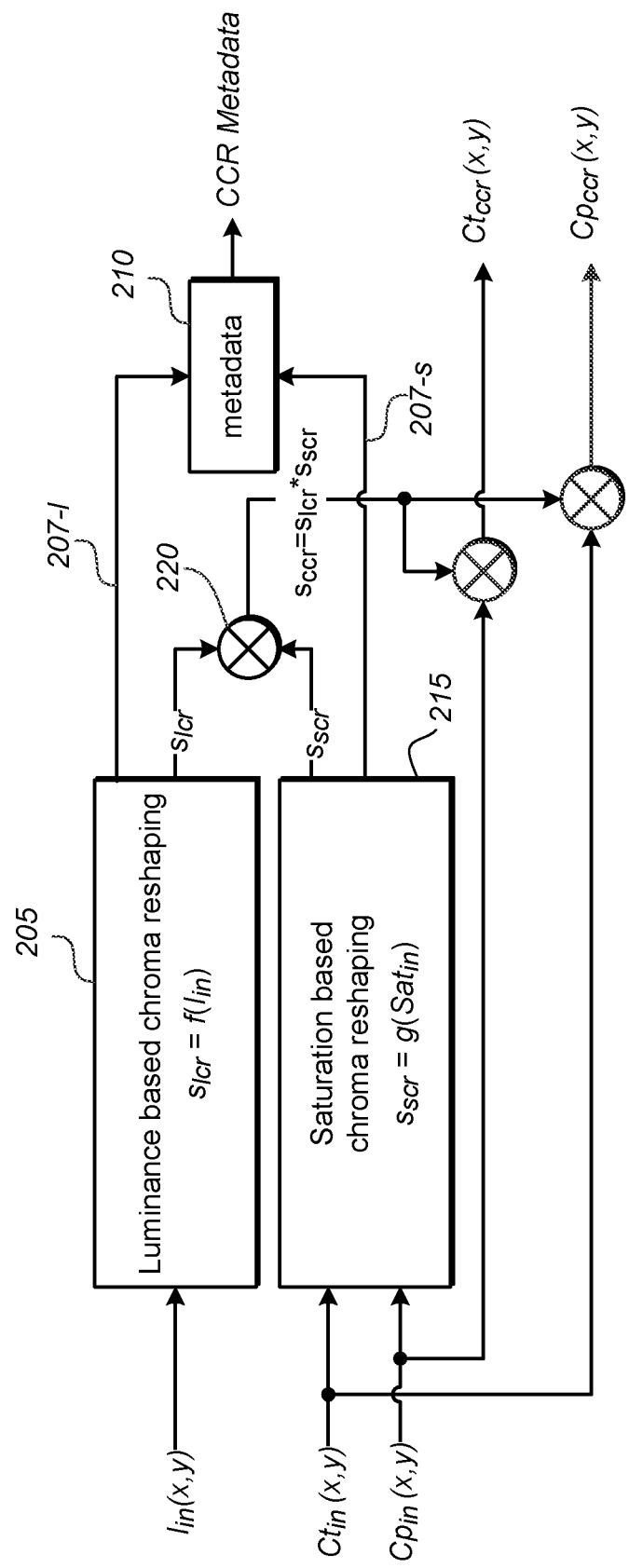
FIG. 2 depicts an example of forward chroma reshaping according to an embodiment of this invention.

FIG. 2 depicts an example of forward chroma reshaping according to an embodiment. As depicted in FIG. 2, given an input with components $I_{in}(x,y)$, $Ct_{in}(x,y)$, and $Cp_{in}(x,y)$, block (205) generates a luminance-based chroma reshaping (LCR) scaler $s_{lcr}$. Similarly, block (215) generates a saturation-based chroma reshaping (SCR) scaler $s_{lcr}$. The two scalers are multiplied together (220) to generate a forward cascaded chroma reshaping (CCR) parameter ($s_{ccr}$), which is applied to both the input $Ct_{in}$, and $Cp_{in}$ values to generate reshaped $Ct_{ccr}$, and $Cp_{ccr}$ values. Parameters (207-1, 207-s) related to generating the LCR and SCR scalers are passed to block 210, which generates appropriate CCR metadata.

In an embodiment, the LCR and SCR scalers may be expressed as $$s_{lcr} = f(I_{in}(x,y)),$$

$$s_{scr} = g(Sat_{in}), \quad (3)$$

where, $Sat_{in}$ may be computed using equation (1), and ƒ( ) and g( ) denote LCR and SCR functions to be discussed in more detail later on.

A cascaded chroma scaling factor can be computed as $$s_{ccr} = s_{lcr} * s_{scr}, \quad (4)$$

The CCR factor $s_{ccr}$ is then multiplied with each chroma component to complete the forward cascade chronic reshaping:

$$Ct_{ccr} = s_{ccr} * Ct_{in},$$

$$Cp_{ccr} = s_{ccr} * Cp_{in}. \quad (5)$$

In an embodiment, the LCR and SCR scalers can be controlled independently depending on the characteristics of the input. For example, if the content is fairly bright with few dark areas, then LCR could be disabled or bypassed, and $s_{lcr}$ may simply be set to 1. Similarly, if the input does not contain low saturation areas, then SCR scaling may be disabled or bypassed, and $s_{scr}$ may simply be set to 1. Since the same scaling factor is applied to both chroma components (to maintain the hue), this is equivalent to applying that scale factor directly on saturation (i.e., saturation reshaping):

$$Sat_{ccr} = \sqrt{(Ct_{ccr}^2 + Cp_{ccr}^2)} = \sqrt{(s_{ccr}^2 * Ct_{in}^2 + s_{ccr}^2 * Cp_{in}^2)} = s_{ccr} * Sat_{in}. \quad (6)$$

Let $Sat_{scr}$ denote a reshaped saturation based only on saturation-based reshaping. Since $s_{scr}$ is modeled as function g(Sat) and $Sat_{scr} = s_{scr} * Sat_{in}$, one can get a new function h(Sat) to directly formulate the mapping between original saturation and reshaped saturation, given by:

$$Sat_{scr} = h(Sat_{in}) = g(Sat_{in}) * Sat_{in}. \quad (7)$$

Inverse Reshaping

Figure 3A:
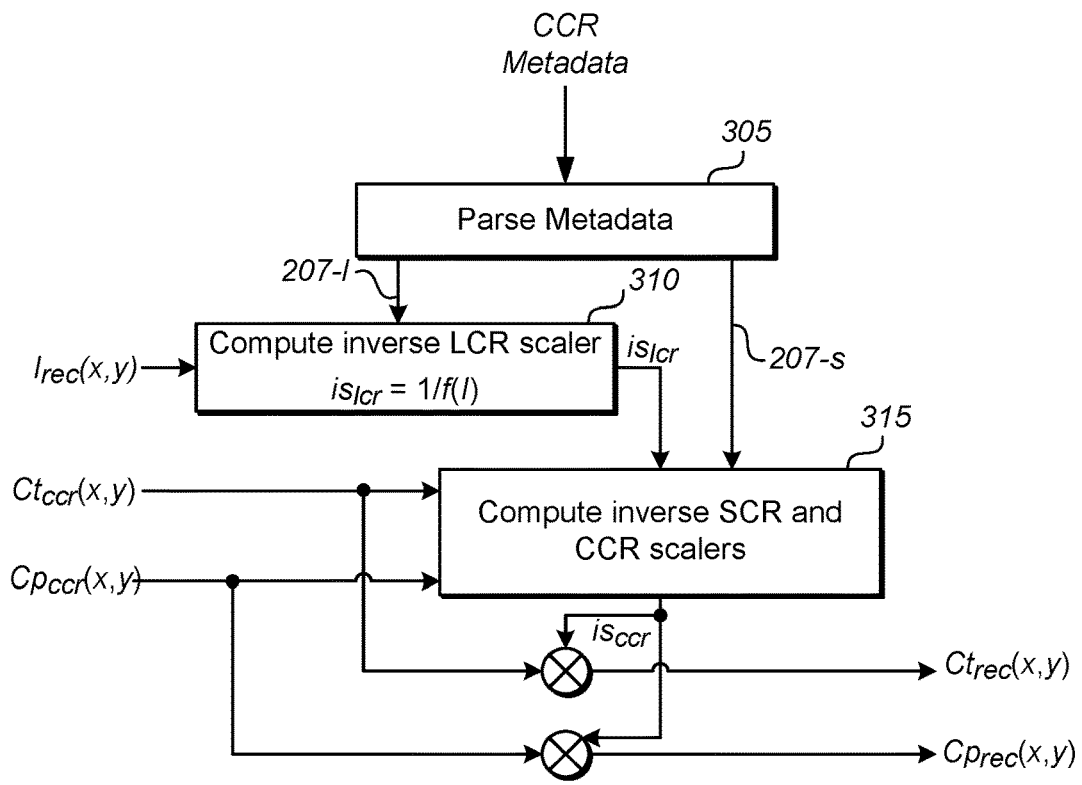
FIG. 3A and FIG. 3B depict examples of inverse or backward chroma reshaping according to embodiments of this invention.
Figure 3B:
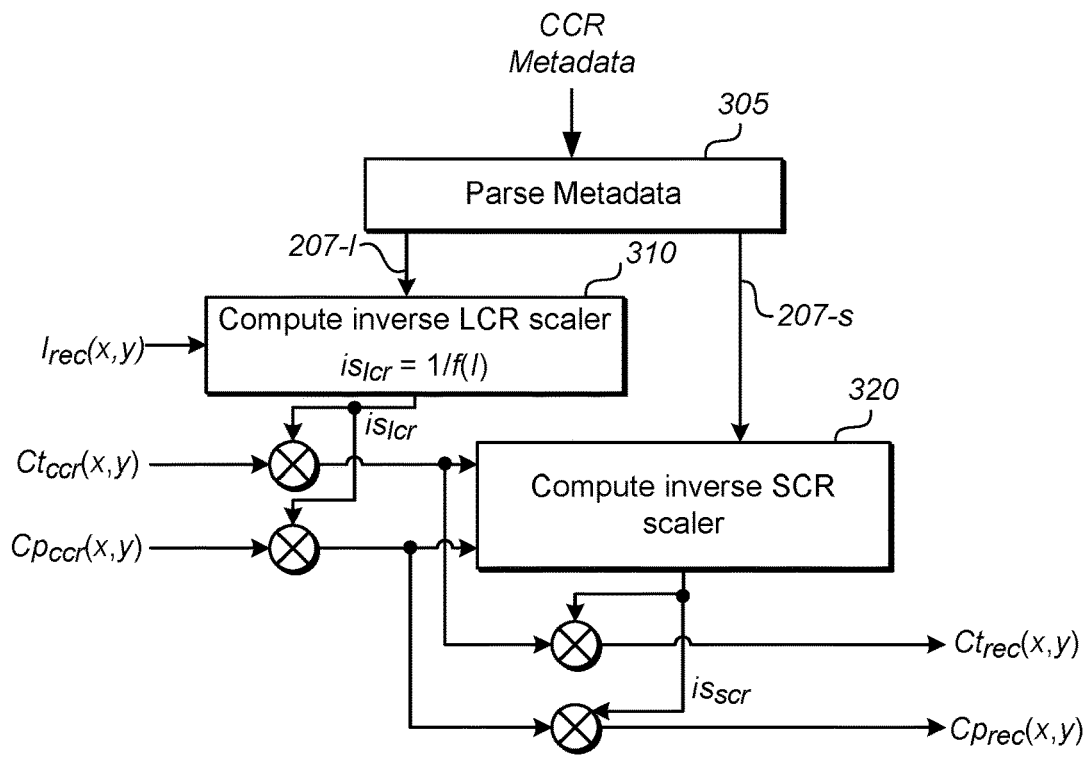

FIG. 3A and FIG. 3B depict examples of inverse or backward reshaping according to embodiments. In a decoder, given incoming CCR metadata, parser (305) generates LCR-(207-1) and SCR-related ((207-s) parameters. Let $I_{rec}(x,y)$ denote the reconstructed intensity value of a pixel in position (x,y). In block (310), the inverse luma-based chroma reshaping scaler is computed as $$is_{lcr} = \frac{1}{f(I_{rec}(x,y))}. \quad (8)$$

Given $is_{lcr}$, $$Sat_{scr} = is_{lcr} * Sat_{ccr}.$$

In one embodiment, as depicted in FIG. 3A, the decoder may generate an inverse saturation scaler as $$Sat_{inv} = h^{-1}(Sat_{scr}) = h^{-1}(is_{lcr} * Sat_{ccr}) \quad (9)$$

Then, at the output of (315), the overall inverse cascade chroma reshaping factor is, is given by:

$$is_{ccr} = \frac{Sat_{inv}}{Sat_{ccr}}. \quad (10)$$

Finally, the inverse (or reconstructed) reshaped chroma components are computed as:

$$Ct_{rec} = is_{ccr} * Ct_{ccr},$$

$$Cp_{rec} = is_{ccr} * Cp_{ccr}. \quad (11)$$

In an alternative embodiment (FIG. 3B), the inverse cascaded reshaping process may be broken in two steps where the inverse LCR and SCR scalers are applied sequentially, thus allowing more clipping controls of the intermediate values to validate data against coding errors. This implementation is slightly more favorable when coding errors are significant but at the cost of additional computation complexity. Two intermediate chroma variables $Ct_{scr}$ and $Cp_{scr}$ are introduced:

$$Ct_{scr} = is_{lcr} * Ct_{ccr},$$

$$Cp_{scr} = is_{lcr} * Cp_{ccr}, \quad (12)$$

Given that $$Sat_{scr} = \sqrt{(Ct_{scr}^2 + Cp_{scr}^2)}, \quad (13)$$

$$Sat_{inv} = h^{-1}(Sat_{scr})$$

and $$is_{scr} = \frac{Sat_{inv}}{Sat_{scr}}, \quad (14)$$

the inverse reshaped chroma components are computed as:

$$Ct_{rec} = is_{scr} * Ct_{scr}$$

$$Cp_{rec} = is_{scr} * Cp_{scr}. \quad (15)$$

LCR Function Considerations

Figure 4:
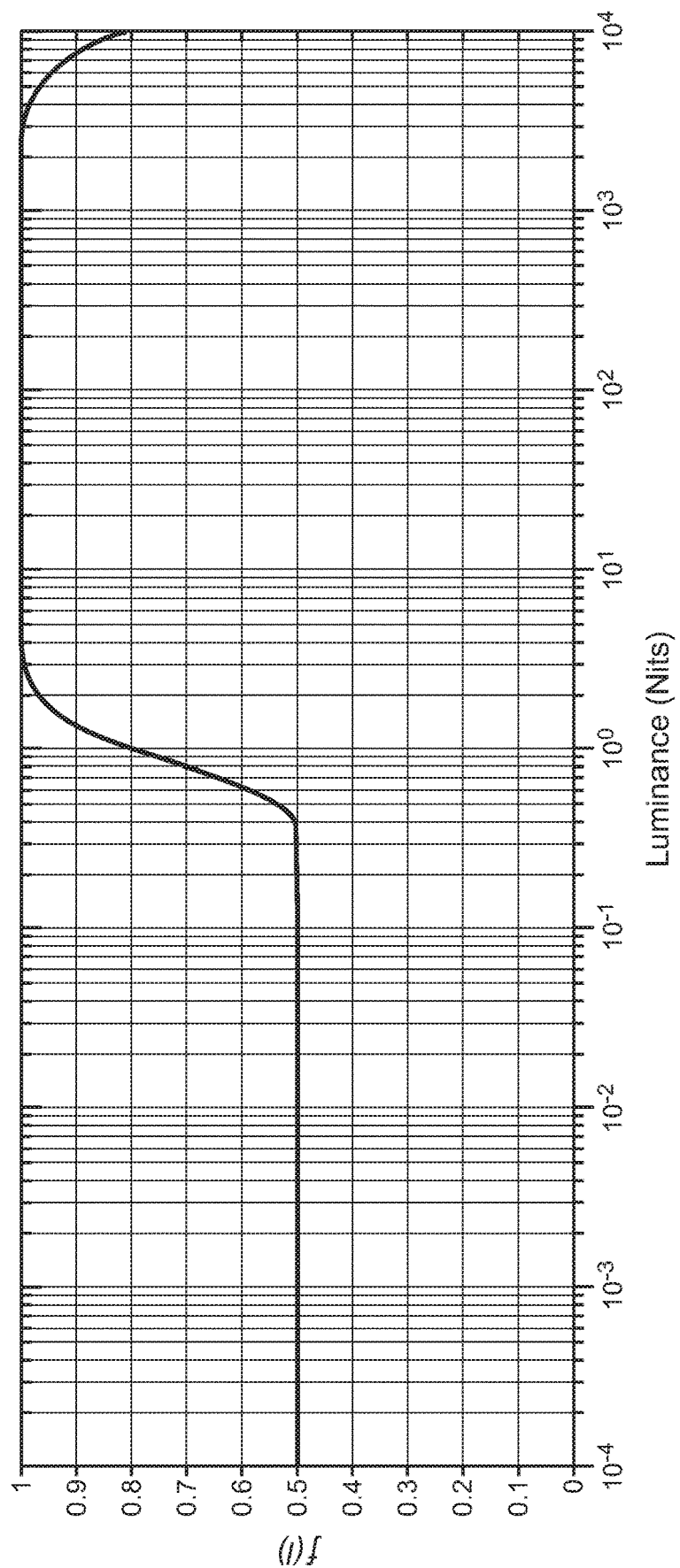
FIG. 4 depicts an example of a luma-based chroma reshaping (LCR) function according to an embodiment of this invention.

Based on the subjective tests, the ideal LCR function (f(I)) should be a non-monotonic, bell-shaped function of the luminance. It should generate smaller scaling factors at both very low luminance ranges and at very high luminance ranges (e.g., more than 1,000 nits). In one embodiment, without limitation, the LCR function $s_{lcr}=f(I)$ (where I is normalized intensity value in range [0 1]) can be represented as a generalized Gaussian function:

$$s_{lcr} = R * e^{-\left(\frac{abs(log10(PQ2L(I)+0.001)-u)}{1.414*\sigma}\right)^{\beta}} + (1-R), \quad (16)$$

where PQ2L( ) is the SMPTE ST 2084 transfer function to convert normalized PQ values to luminance; abs( ) is the absolute value function and log 10( ) is the base-10 logarithm function. This function has four parameters which can be adaptively adjusted:

R: range, it controls the range that $s_{lcr}$ can vary, the valid R value is in [0 1]. Consequently, the maximum possible $s_{lcr}$ value is 1 and the minimum is 0.

u: the center (mean) of the generalized Gaussian; it is the luminance (in log 10) that yields the maximum scale factor; valid values are in [0 3] (1-1,000 nits).

β: the steepness of the roll off; reasonable value range is in [2 18]. The larger the value of β, the steeper is the roll off;

σ: the width or standard deviation of the generalized Gaussian;

An example is shown in FIG. 4 with parameters R=0.5, u=2.0, β=12, and σ=1.5. The generated $s_{lcr}$ is kept close to 1 in luminance range 1 to 1,000 nits, and is reduced in very high and low luminance ranges to exploit the "masking" feature by reducing chroma signal energy in these luminance ranges.

In another embodiment, the LCR function may be expressed as a piece-wise linear or non-linear polynomial, or as some other nonlinear function which could approximate the masking effects due to luminance values.

SCR Function Considerations

Based on the observations from the subjective experiments, in some embodiments, the ideal SCR function should amplify the saturation in the most achromatic areas (i.e. the low saturation areas). In one embodiment, without limitation, an example SCR function $s_{scr}=g(Sat_{in})$ may be expressed as a two-pieces linear function:

$$s_{scr} = \begin{cases} \frac{V_2 - V_1}{T} * Sat_{in} + V_1 & Sat_{in} \leq T \\ V_2 & Sat_{in} > T \end{cases} \quad (17)$$

which can also be expressed as:

$$s_{scr} = \frac{V_2 - V_1}{T} * \min(T, Sat_{in}) + V_1. \quad (18)$$

Figure 5:
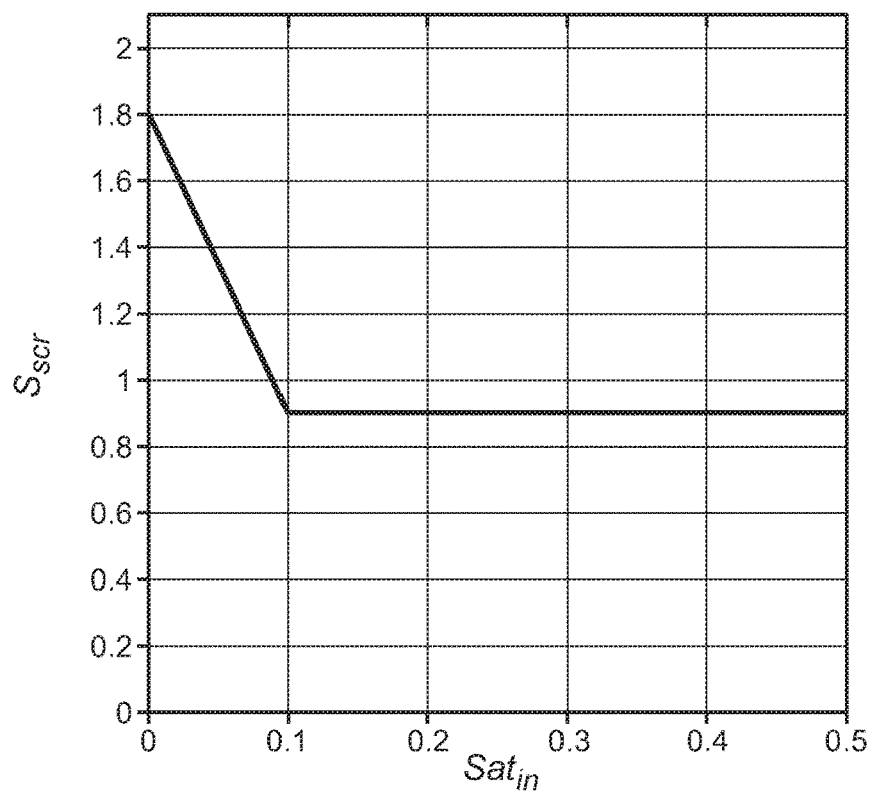
FIG. 5 depicts an example of a saturation-based chroma reshaping (SCR) function according to an embodiment of this invention.
Figure 6:
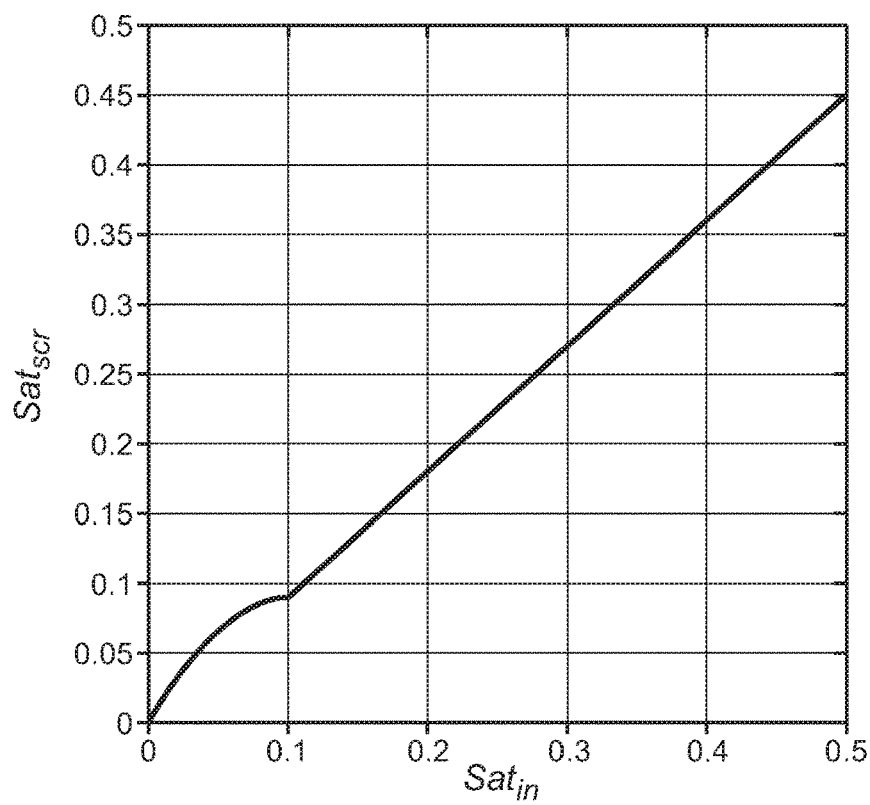
FIG. 6 depicts an example of reshaped saturation values when using the SCR function depicted in FIG. 5.

Parameters for this function include:
T: a transition threshold;
$V_1$: desired scale factor at Sat=0;
$V_2$: desired scale factor for saturated colors;

FIG. 5 depicts an example of $s_{scr}=g(Sat_{in})$ with parameters T=0.1, $V_1$=1.8, and $V_2$=0.9. As desired, the generated scaling factor $s_{scr}$ is larger than one in low saturation areas. Given equation (7), the corresponding $Sat_{scr}=h(Sat_{in})$ function is shown in FIG. 6.

It will be appreciated that the function as expressed in equation (17) is a monotonically decreasing function, the output of which is highest for a lowest interval of $Sat_{in}$.

As depicted in FIG. 5, typically $V_1>V_2$; however, in some embodiments, depending on the scene content, in the SCR function of equation (17), $V_1$ may be defined to be smaller than $V_2$. For example, in a relative dark scene, skin tones (e.g., of a face with some make up) may be far more important than achromatic areas, since those areas may be mostly dark. For example, in such a scenario, a piecewise SCR function of equation (17) with T=0.15, $V_1$=0.75, and $V_2$=1.1 may be applied.

In other embodiments, the characteristics of the ideal SCR function g(x) could be represented using alternative piecewise linear or non-linear functions, or other non-linear functions.

CCR Metadata and Bitstream Syntax

Based on the implementation of the CCR model with LCR and SCR functions, the CCR metadata consists of the parameters of the LCR function and the SCR function. In one embodiment, the CCR metadata can be designed as a bitstream that starts with an LCR_enable_flag, followed by values for R, u, β, and σ, and an SCR_enable_flag, followed by the values for T, $V_1$, and $V_2$.

The signaling of LCR and SCR parameters can be controlled by the two flags LCR_enable_flag and SCR_enable_flag. If either flag is 0, the corresponding function parameters are not transmitted and the corresponding scale factor is set to 1 by default. Otherwise, the scale factors are derived based on the actual parameters received. The signaling of the parameters can be implemented with floating point or fixed point at desired precision.

The CCR syntax structure can be put inside the regular reshaping syntax as defined in U.S. Provisional Patent Application Ser. No. 62/237,852, filed on Oct. 6, 2015, "Signal Reshaping and Coding for HDR and Wide Color Gamut Signals," by P. Yin et al., or in N15792 (referenced earlier), and the whole reshaping syntax can be inserted in PPS extension or in an SEI message. Parameter adaptation (changes) may occur at the scene level (same as traditional reshaping design). Since only a few parameters need signaling and changes happen in an infrequent way, the bitrate overhead is negligible.

In one embodiment, Table 1 shows an example syntax for CCR metadata.

TABLE 1

Example Syntax of CCR Metadata

| reshaping_syntax( ) { | Descriptor |
| --- | --- |
| ... | |
|   reshape_LCR_enable_flag | u(1) |
|   if(reshape_LCR_enable_flag) { | |
|     reshape_LCR_range | se(v) |
|     reshape_LCR_center | se(v) |
|     reshape_LCR_beta | se(v) |
|     reshape_LCR_sigma | se(v) |
|   } | |
|   reshape_SCR_enable_flag | u(1) |
|   if(reshape_SCR_enable_flag) { | |
|     reshape_SCR_threshold | se(v) |
|     reshape_SCR_value1 | se(v) |
|     reshape_SCR_value2 | se(v) |
|   } | |
| ... | |
| } | |

Figure 7:
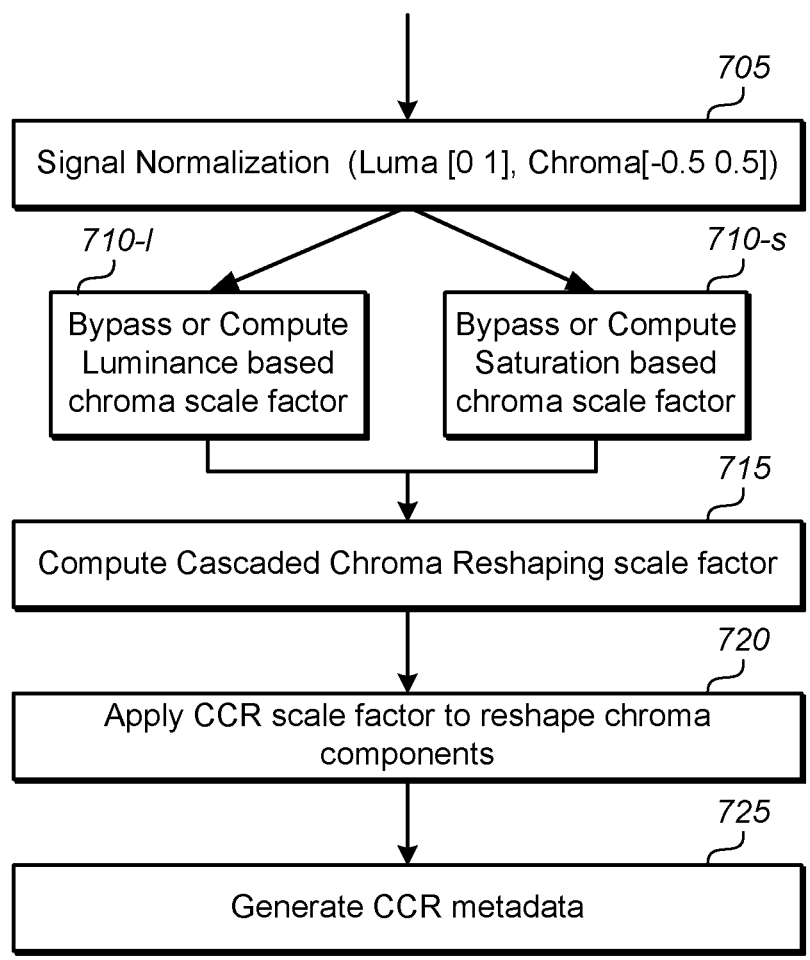
FIG. 7 depicts an example process of forward chroma reshaping in an encoder according to an embodiment of this invention.

FIG. 7 depicts an example process of forward chroma reshaping according to an embodiment. Given an input video signal, in step 705, if needed, the signal is translated into a codec-friendly color format, such as ICtCp, with normalized intensity and chroma values. Depending on the characteristics of the input signal in terms of bright or low-saturation areas, in step 710, decisions are made whether to employ LCR and/or SCR scaling and then the appropriate scaling factors are computed (e.g., using equations (1)-(3)). In step 715, the two scaling factors are multiplied to generate a cascaded chroma reshaping (CCR) factor, which is then applied in step 720 to the chroma components. In step 725, appropriate metadata are generated and are embedded into the coded bitstream.

Figure 8:
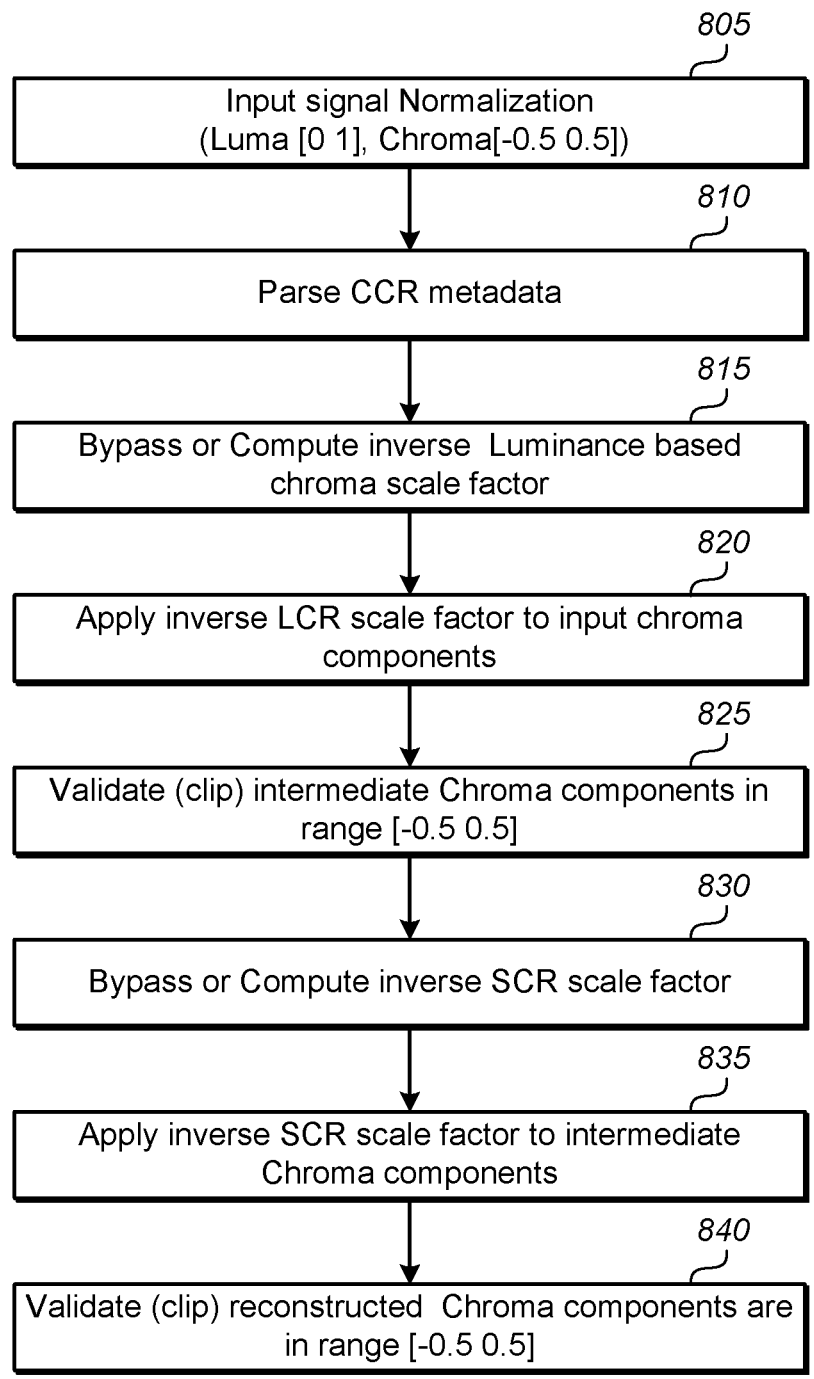
FIG. 8 depicts an example process of inverse chroma reshaping in a decoder according to an embodiment of this invention.

In a decoder, FIG. 8 depicts an example process of inverse chroma reshaping according to an embodiment. If needed, in step 805, the intensity and chroma output values from a decoder (130) are normalized. In step 810, the CCR metadata are parsed to generate the $f(\ )$ and inverse $h(\ )$ ($h^{-1}(\ )$) functions required to generate the inverse reshaping scale factors as described by equations (8)-(15). Assuming the two-step process of FIG. 3B, steps 815, 820 and 830 compute as needed the inverse scaling factors (e.g., $is_{lcr}$ and $is_{scr}$) to be used generate in step 835 the reconstructed chroma components. Optional steps 825 and 840 may be used to validate that both the intermediate chroma components and the reconstructed chroma components are within valid ranges (e.g., [−0.5, 0.5]), if not, those values are clipped to be within the valid range.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to chroma reshaping of HDR video, such as those described herein. The computer and/or IC may compute any of a variety of parameters or values that relate to chroma reshaping of HDR video processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to chroma reshaping of HDR video as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to the efficient chroma reshaping of HDR video are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEEs):

EEE 1. In a video encoder, a method to reshape chroma components, the method comprising:
  receiving an input image comprising pixels, wherein each pixel comprises a luminance component and two chroma components;
  for a pixel in the input image:
    generating a first scaler based on a luma-based chroma reshaping (LCR) function and the luma component of the pixel;
    computing a saturation value for the pixel based on the chroma components of the pixel;
    computing a second scaler based on a saturation-based chroma reshaping (SCR) function and the saturation value of the pixel;
    generating a cascaded scaler by multiplying the first scaler with the second scaler; and
    generating reshaped chroma components for the pixel by multiplying each of the chroma components of the pixel with the cascaded scaler.

EEE 2. The method of EEE 1, further comprising generating reshaping metadata comprising parameters of the LCR function and the SCR function.

EEE 3. The method of EEE 1 or 2, wherein each pixel is coded in the ICtCp color format.

EEE 4. The method pf EEE 3, wherein computing the saturation value of the pixel comprises computing $$Sat = \sqrt{C_T^2 + C_P^2},$$

where $C_T$ and $C_P$ denote the two chroma components of the pixel.

EEE 5. The method of any of EEEs 1-4, wherein the LCR function comprises a bell-shaped function.

EEE 6. The method of EEE 5, wherein the output of the LCR function is larger for a mid-range of luma values, than for other luma values.

EEE 7. The method of EEE 5 or 6, wherein the LCR function comprises a generalized Gaussian function of the form $$s_{lcr} = R*e^{-\left(\frac{abs(log10(PQ2L(I)+0.001)-u)}{1.414*\sigma}\right)^\beta} + (1-R),$$

where I denotes the input luminance value, R denotes a range, u denotes a mean, $\beta$ denotes steepness, and $\sigma$ denotes a width.

EEE 8. The method of any of EEEs 1-7, wherein the SCR function is monotonically decreasing or monotonically increasing.

EEE 9. The method of EEE 8, wherein the SCR function comprises $$s_{lcr} = \begin{cases} \frac{V_2-V_1}{T}*Sat_{in}+V_1 & Sat_{in} \leq T \\ V_2 & Sat_{in} > T \end{cases}$$

where T denotes a threshold, $Sat_{in}$ denotes the input saturation value, $V_1$ denotes the output scaling factor when $Sat_{in}=0$, and $V_2$ denotes the output scaling factor for $Sat_{in}>T$.

EEE 10. In a decoder, a method to perform inverse reshaping of chroma components, the method comprising:
receiving a reshaped image comprising pixels, wherein each pixel comprises a luminance component and two chroma components;
for a pixel in the reshaped image:
generating a first inverse scaler based on a luma-based chroma reshaping (LCR) function and the luma component of the pixel;
computing a saturation value for the pixel based on the chroma components of the pixel;
generating a scaled saturation value by multiplying the saturation value with the first inverse scaler;
computing an inverse saturation value based on a saturation-based chroma reshaping (SCR) function and the scaled saturation value of the pixel;
computing a second inverse scaler by dividing the inverse saturation value with the saturation value; and
generating inverse reshaped chroma components for the pixel by multiplying each of the chroma components of the pixel with the second inverse scaler.

EEE 11. In a decoder, a method to perform inverse reshaping of chroma components, the method comprising:
receiving a reshaped image comprising pixels, wherein each pixel comprises a luminance component and two chroma components;
for a pixel in the reshaped image:
generating a first inverse scaler based on a luma-based chroma reshaping (LCR) function and the luma component of the pixel;
computing intermediate chroma components by multiplying each of the two chroma components of the pixel with the first inverse scaler;
computing a saturation value for the pixel based on the intermediate chroma components of the pixel;
computing an inverse saturation value based on a saturation-based chroma reshaping (SCR) function and the saturation value of the pixel;
computing a second inverse scaler by dividing the inverse saturation value with the saturation value; and
generating inverse reshaped chroma components for the pixel by multiplying each of the chroma components of the pixel with the second inverse scaler.

EEE 12. The method of EEE 10 or EEE 11, wherein generating the first inverse scaler comprises computing $$is_{lcr} = \frac{1}{f(I_{rec}(x,y))},$$

wherein $f(\ )$ denotes the LCR function, and $I_{rec}(x,y)$ denotes the luma component of the pixel.

EEE 13. The method of any of EEEs 10-12, wherein generating the inverse saturation value comprises computing $$Sat_{inv} = h^{-1}(Sat_{scr}),$$

wherein, for a saturation input Sat, h(Sat)=g(Sat) Sat, and g(Sat) denotes the SCR function.

EEE 14. The method of any of EEEs 10-13, further comprising receiving parameters for determining the LCR function and the SCR function from metadata transmitted from an encoder to the decoder.

EEE 15. The method of any of EEEs 10-14, wherein the LCR function comprises a bell-shaped function.

EEE 16. The method of any of EEEs 10-15, wherein the LCR function comprises a generalized Gaussian function of the form $$s_{lcr} = R*e^{-\left(\frac{abs(log10(PQ2L(I)+0.001)-u)}{1.414*\sigma}\right)^\beta} + (1-R),$$

where I denotes the input luminance value, R denotes a range, u denotes a mean, $\beta$ denotes steepness, and $\sigma$ denotes a width.

EEE 17. The method of any of EEEs 10-16, wherein the SCR function is monotonically decreasing or monotonically increasing.

EEE 18. The method of any of EEEs 10-17, wherein the SCR function comprises $$s_{scr} = \begin{cases} \frac{V_2-V_1}{T}*Sat_{in}+V_1 & Sat_{in} \leq T \\ V_2 & Sat_{in} > T \end{cases}$$

where T denotes a threshold, $Sat_{in}$ denotes the input saturation value, $V_1$ denotes the output scaling factor when $Sat_{in}=0$, and $V_2$ denotes the output scaling factor for $Sat_{in}>T$.

EEE 19. An apparatus comprising a processor and configured to perform any one of the methods recited in EEEs 1-18.

EEE 20. A non-transitory computer-readable storage medium having stored thereon computer-executable instruction for executing a method with one or more processors in accordance with any one of the EEEs 1-18.

The invention claimed is:

1. In a video encoder, a method to reshape chroma components of a high dynamic range image, the method comprising:

receiving an input high dynamic range image comprising pixels, wherein each pixel is coded in the $IC_TC_P$ color format and comprises a luma component I, a first chroma component $C_T$ and a second chroma component $C_p$; and for a pixel in the input high dynamic range image:
generating a first scaler as a function of the luma component of the pixel, wherein the function of the luma component comprises a bell-shaped function;
generating the colour saturation of the pixel as a function of the first and second chroma components according to the function $Sat=\sqrt{C_T^2+C_P^2}$;
generating a second scaler as a piecewise, monotonically decreasing function of the colour saturation of the pixel; and
generating, as first and second reshaped chroma components for the pixel, i) the multiplicative product of the first chroma component, the first scaler and the second scaler and ii) the multiplicative product of the second chroma component, the first scaler and the second scaler.

2. The method of claim 1, wherein the function suitable for generating values of the first scaler is suitable for generating a highest value of the first scaler for luma values in the range 100 to 1000 nits.

3. The method of claim 1, wherein the bell-shaped function comprises a generalized Gaussian function of the form $$s_{lcr} = R*e^{-\left(\frac{abs(log10(PQ2L(I)+0.001)-u)}{1.414*\sigma}\right)^\beta} + (1-R),$$

where I denotes the input luma value of the pixel in the ICtCp color format, PQ2L( ) denotes the SMPTE 2084 transfer function to convert normalized PQ values to luminance, R denotes a range, u denotes a mean, β denotes steepness, and σ adenotes a width.

4. The method of claim 1, wherein the piecewise, monotonically decreasing function is such that the second scaler is greater than 1 in a lowest-saturation interval of the colour saturation of the pixel.

5. The method of claim 4, wherein the piecewise, monotonically decreasing function is such that the second scaler is less than 1 in another interval of the colour saturation of the pixel.

6. The method of claim 1, further comprising generating reshaping metadata.

7. The method of claim 6, wherein the reshaping metadata comprises at least one parameter of the function of at least the luma component of the pixel.

8. The method of claim 6, wherein the reshaping metadata comprises at least one parameter of the function of the colour saturation of the pixel.

9. In a decoder, a method to perform inverse reshaping of chroma components of a high dynamic range image, the method comprising:
receiving a reshaped high dynamic range image comprising pixels, wherein each pixel comprises a luminance component I, a first reshaped chroma component $CT_{ccr}$ and a second chroma reshaped component $CP_{ccr}$; and
for a pixel in the reshaped high dynamic range image:
generating a first inverse scaler as a function of the luma component of the pixel, by applying, to the luma component of the pixel, the inverse of a function that generates values of a first forward scaler;
generating the reshaped colour saturation of the pixel as a function of the first and second reshaped chroma components according to the function $Sat_{ccr}=\sqrt{CT_{ccr}^2+CP_{ccr}^2}$;
generating a second inverse scaler as a function of the reshaped colour saturation of the pixel; and
generating, as first and second inverse reshaped chroma components in the $IC_TC_P$ color format for the pixel, i) the multiplicative product of the first reshaped chroma component, the first inverse scaler and the second inverse scaler and ii) the multiplicative product of the second reshaped chroma component, the first inverse scaler and the second inverse scaler.

10. The method of claim 9, wherein the function suitable for generating values of the first forward scaler is suitable for generating a highest value of the first forward scaler for luma values in the range 100 to 1000 nits.

11. The method of claim 9, wherein the function for generating values of the first forward scaler comprises a bell-shaped function.

12. An apparatus comprising a processor and configured to perform the method of claim 1.

13. A non-transitory computer-readable storage medium having stored thereon computer-executable instruction for executing a method with one or more processors in accordance with claim 1.

* * * * *